No. 871,662.
PATENTED NOV. 19, 1907.
J. P. AYLESWORTH.
LATHE TOOL.
APPLICATION FILED NOV. 24, 1906.
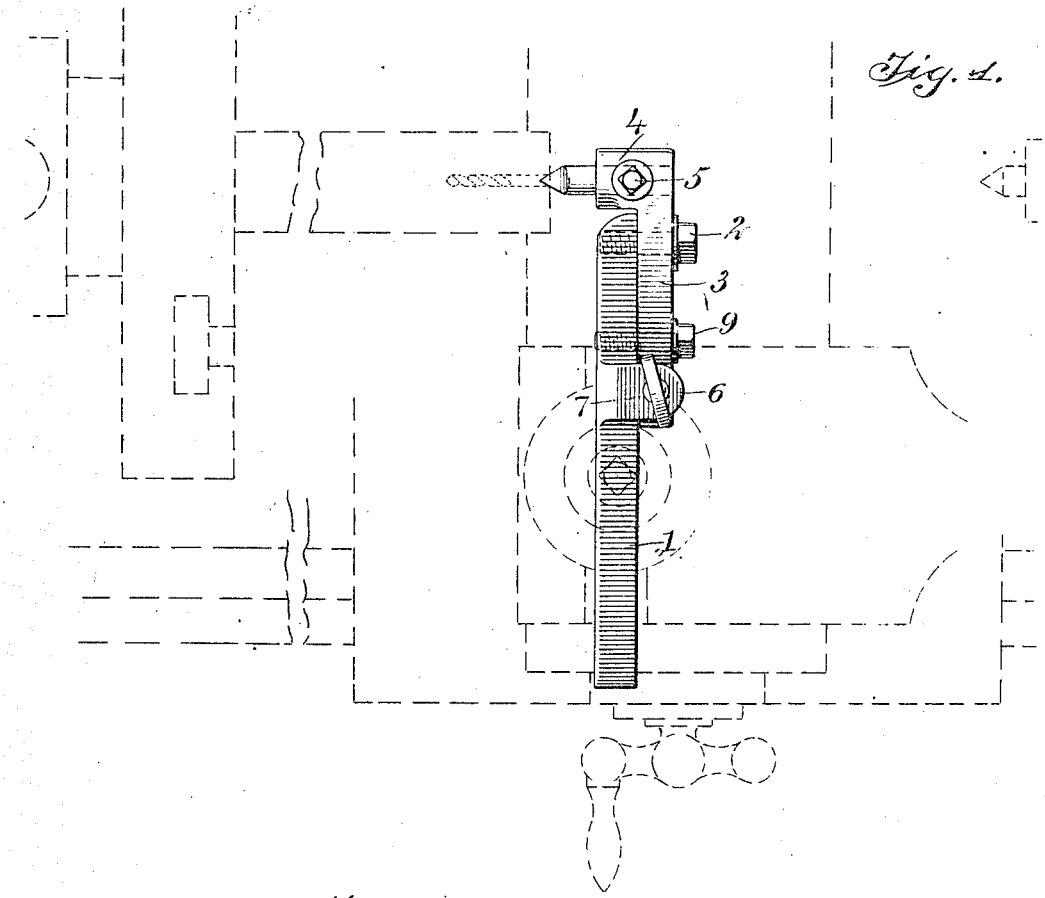
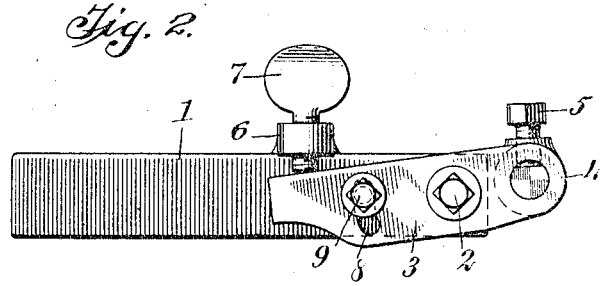
WITNESSES
INVENTOR
Julius P. Aylesworth
BY
ATTORNEYS

UNITED STATES PATENT OFFICE.

JULIUS P. AYLESWORTH, OF ENDEAVOR, PENNSYLVANIA.

LATHE-TOOL.

No. 871,662.　　　　Specification of Letters Patent.　　　Patented Nov. 19, 1907.

Application filed November 24, 1906. Serial No. 344,864.

*To all whom it may concern:*

Be it known that I, JULIUS P. AYLESWORTH, a citizen of the United States, and a resident of Endeavor, in the county of Forest and State of Pennsylvania, have invented a new and Improved Lathe-Tool, of which the following is a full, clear, and exact description.

This invention is an improved tool designed for use in connection with a machine lathe to accurately center the work carried by the lathe, with ease and facility.

One embodiment of the invention consists of a shank having an arm pivotally connected near the outer end thereof, said arm projecting slightly beyond the shank, where it is provided with an apertured enlargement for holding devices used in the centering operation. A suitable adjusting and a clamping screw are carried by the shank for adjusting the vertical height of the centering device and clamping the same in adjusted position.

Reference is to be had to the accompanying drawings forming a part of this specification, in which similar characters of reference indicate corresponding parts in all the figures.

Figure 1 is a plan view of my improved centering tool, showing in dotted outline the manner in which it is applied to the tool-post of a lathe and used to center a shaft or other like device clamped in the chuck, and Fig. 2 is a side elevation of the tool.

The preferred form of tool comprises a shank 1 square or oblong in cross section, or of other suitable form to be conveniently applied to the tool-post of a machine lathe. Pivotally attached to the outer end of the shank 1 as by a bolt 2, is an arm 3. This arm extends at its outer end just beyond the shank 1, where it is provided with an apertured enlargement 4 for receiving the shank of drills, countersinks or other centering devices. These are held in place by a set-screw 5 threaded into the enlargement and passing into the aperture of the same.

At the rear of the pivot-bolt 2 an ear 6 is formed as an integral part, or otherwise secured to the upper edge of the shank 1 and overhangs the rear end of the arm 3. A thumb-screw 7 is threaded through this ear bearing on the arm, and is operable to adjust the vertical height of the centering device. For securing the arm in adjusted position, an arc-shaped slot 8 is cut therein concentric with the pivot-bolt 2 and is engaged by a screw 9 threaded into the shank 1. The arm 3 is constructed and pivoted at a point so that its inner end will, through the action of gravity, at all times press on the screw 7, thus requiring no additional device to keep these parts engaged.

In the use of the tool, the shank 1 is applied to the tool-post in the ordinary manner, and a countersinking device clamped in the arm by the set-screw 5. The carriages of the lathe and the thumb-screw 7 are then operated to bring the countersink to the center of the work when the longitudinal feed of the lathe is moved forward to cut a sufficient opening in the work for guiding a drill. The drill is then substituted for the countersink and likewise brought into action. The countersink is then again placed in the holder and the center cut to the desired proportion.

Having thus described my invention I claim as new and desire to secure by Letters Patent:

1. A lathe tool comprising a shank, an arm pivotally attached to the shank having means for clamping a device in the outer end thereof, and a screw carried by the shank pressing on the arm, said arm being so balanced on its pivot as to normally engage the screw.

2. A lathe tool comprising a shank, an arm pivotally connected to the shank having an aperture passing transversely therethrough eccentric to its pivotal connection, means for clamping a tool in the aperture and means for holding the arm against movement with respect to the shank.

3. A lathe tool comprising a shank, an arm pivotally connected to the shank having an aperture passing transversely therethrough eccentric to its pivotal connection, means for clamping a tool in the aperture, and means removed from said pivotal connection for clamping the arm in adjusted position.

In testimony whereof I have signed my name to this specification in the presence of two subscribing witnesses.

JULIUS P. AYLESWORTH.

Witnesses:
　O. P. LEMON,
　EMMA GROLEMUND.